(12) United States Patent
Hisano

(10) Patent No.: US 9,141,909 B2
(45) Date of Patent: Sep. 22, 2015

(54) TURNING PROBABILITY PREDICTION APPARATUS AND METHOD

(71) Applicant: DENSO CORPORATION, Kariya, Aichi-pref. (JP)

(72) Inventor: Takuya Hisano, Ibi-gun (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 13/772,441

(22) Filed: Feb. 21, 2013

(65) Prior Publication Data
US 2013/0226454 A1 Aug. 29, 2013

(30) Foreign Application Priority Data

Feb. 28, 2012 (JP) .................................. 2012-41803

(51) Int. Cl.
*G06N 5/02* (2006.01)
*B60W 40/06* (2012.01)
*G01C 21/26* (2006.01)

(52) U.S. Cl.
CPC ................. *G06N 5/02* (2013.01); *B60W 40/06* (2013.01); *G01C 21/26* (2013.01)

(58) Field of Classification Search
None
See application file for complete search history.

(56) References Cited

U.S. PATENT DOCUMENTS

| 2008/0040029 | A1* | 2/2008 | Breed | 701/208 |
| 2008/0252484 | A1* | 10/2008 | Hopkins | 340/905 |
| 2011/0184622 | A1 | 7/2011 | Yamada et al. | |
| 2012/0054145 | A1 | 3/2012 | Suzuki | |

FOREIGN PATENT DOCUMENTS

JP 2002-190092 A 7/2002

* cited by examiner

*Primary Examiner* — Helal A Algahaim
*Assistant Examiner* — Kelly D Williams
(74) *Attorney, Agent, or Firm* — Posz Law Group, PLC

(57) ABSTRACT

A turning probability prediction apparatus for predicting a turning probability at an intersection at an end of a new road is disclosed. The turning probability prediction apparatus includes a route search device and a prediction device. The route search device retrieves a route that, while extending along a prestored road, leads from the intersection at one end of the new road to the intersection at the other end of the new road. The prediction device predicts the turning probability at the intersection at the end of the new road, based on the probabilities that the turns are made at first to n-th intermediate intersections, wherein the first to n-th intermediate intersections are defined as intersections arranged in the route retrieved by the route search device.

16 Claims, 7 Drawing Sheets

FIG. 7

| TURNING PROBABILITY FOR NEW ROAD (CONVERGED VALUE) | START (x1, x2) = (50, 50)<br>END (y1, y2) = (70, 30) | |
|---|---|---|
| LINK ROAD RANK | NARROW → ARTERIAL → NARROW | |
| NUMBER OF INTMD INTXNS | 2 | |
| INTMD INTXN K1 | FOUR-WAY INTXN | LEFT TURN : 10%<br>NO TURN : 20%<br>RIGHT TURN : 70% (※)<br>U-TURN : 0% |
| INTMD INTXN K2 | FOUR-WAY INTXN | LEFT TURN : 20%<br>NO TURN : 50%<br>RIGHT TURN : 30% (※)<br>U-TURN : 0% |

TURNING PROBABILITY PREDICTION APPARATUS AND METHOD

CROSS REFERENCE TO RELATED APPLICATION

The present application is based on Japanese Patent Application No. 2012-41803 filed on Feb. 28, 2012, disclosure of which is incorporated herein by reference.

TECHNICAL FIELD

The present disclosure relates to a turning probability prediction apparatus that predicts a probability that a turn is made at an intersection.

BACKGROUND

In general, when making a right/left turn at an intersection, a vehicle needs to use its turn signal lamp at a point within a given reach of the intersection to notify nearby vehicles that the vehicle is going to make the right/left turn at the intersection. It is important for a following vehicle's driver to previously recognize the right/left turn of the preceding vehicle. If the following vehicle's driver can know that the preceding vehicle will make a right/left turn at the intersection, he or she can smoothly pass through the intersection by, for example, changing to another lane.

In some actual cases, however, the turn signal lamp is not always manipulated at a point within a given reach of the intersection. The turn signal lamp may be manipulated immediately before the intersection or may not be manipulated at all even though the vehicle is going to make a right/left turn at the intersection.

In such a case, the following vehicle's driver may miss the timing to change the lane and may not be able to smoothly pass through the intersection, because, for example, he or she has to unnecessarily wait at the back of the preceding vehicle that is going to make a left turn.

As a technique for addressing this difficulty there is proposed a system (e.g., see JP-2002-190092A) that stores a history of right/left turning at intersections and predicts right/left turning of the vehicle before the vehicle pass through the intersection.

The technique described in JP-2002-190092A predicts the right/left turn of the vehicle based on the history of the right/left turn at intersections. However, since no history is available for a newly opened road, the right/left turn of the vehicle cannot be accurately predicted until the elapse of a sufficient amount of time. As a result, immediately after a new road is opened, the technique described in JP-2002-190092A fails to enable the vehicle to smoothly pass through an intersection.

SUMMARY

The present disclosure is made in view of the foregoing. It is an object of the present disclosure to provide a turning probability prediction apparatus that can predict a turning probability to predict a right/left turn of a vehicle even immediately after a new road is opened.

According to one example of embodiments, a turning probability prediction apparatus stores turning information on an intersection-by-intersection basis to specify a probability that a turn is made at an intersection, and predicts based on the stored turning information the probability that the turn is made at the intersection at an end of a new road being a road newly added to a map. In the above, the turning information may represent a turning probability itself. The turning information may represent a passage count, a turn count, and no-turn count at the intersection. The turning probability prediction apparatus includes a route search device and a prediction device. The route search device retrieves a route that, while extending along prestored road, leads from the intersection at one end of the new road to the intersection at the other end of the new road. The prediction device predicts the probability that the turn is made at the intersection at each end of the new road, based on the probabilities that the turns are made at first to n-th intermediate intersections, where the first to n-th intermediate intersections are defined as intersections arranged on the route retrieved by the route search device and n is natural number.

In one embodiment, the turning probability prediction apparatus retrieves a route that extends along a prestored road associated with the new road and uses the probability that the turn is made at an intersection on the retrieved route, in order to predict the probability that the turn is made at the intersection at the end of the new road. Accordingly, even immediately after a new road is opened, it is possible to predict a turning probability to predict a right/left turn of a vehicle

BRIEF DESCRIPTION OF THE DRAWINGS

The above and other objects, features and advantages of the present disclosure will become more apparent from the following detailed description made with reference to the accompanying drawings. In the drawings:

FIG. 7 is an explanatory diagram illustrating an example database for a turning similarity determination.

DETAILED DESCRIPTION

An embodiment will be described with reference to the accompanying drawings.

Figure 1:
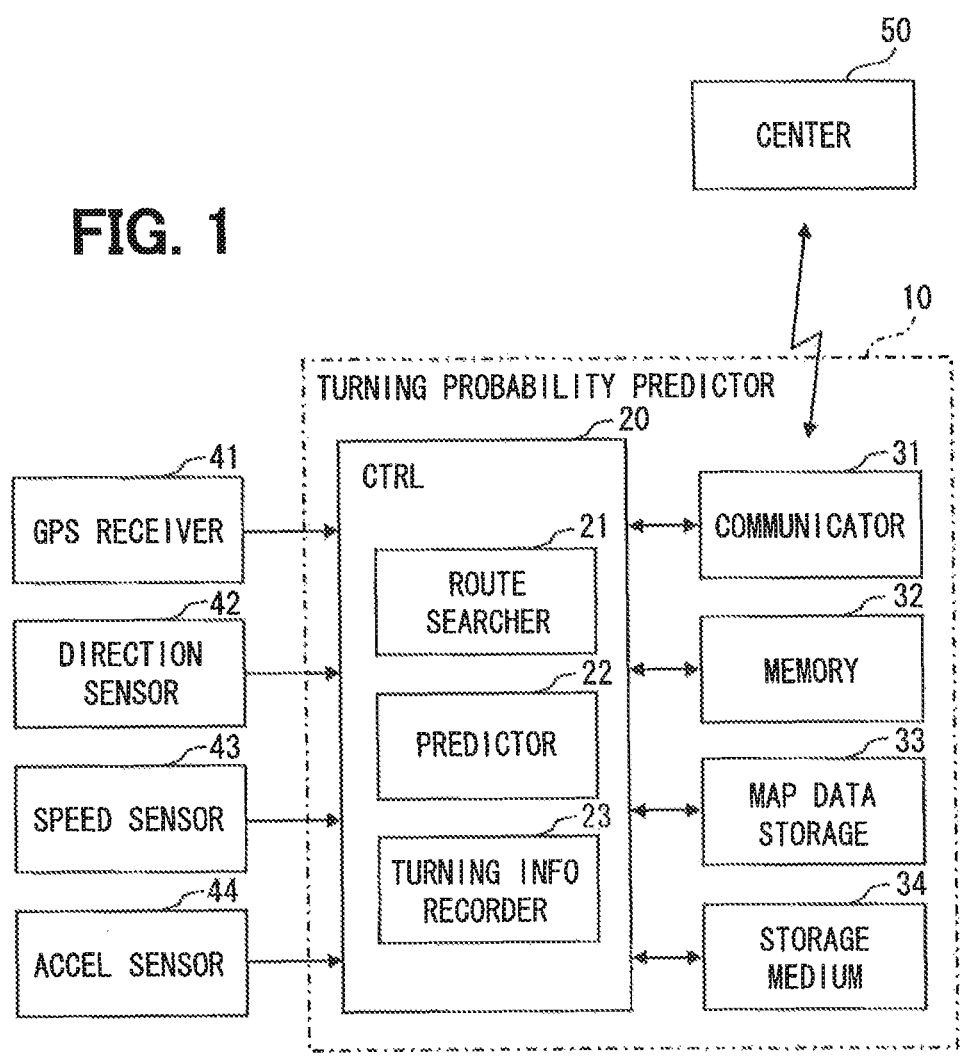
FIG. 1 is a block diagram illustrating a configuration of a turning probability prediction apparatus.

As illustrated in FIG. 1, a turning probability prediction apparatus 10 includes a controller 20, a communication device 31 connected to the controller 20, a memory 32, a map data storage device 33, and a storage medium 34. The controller 20 is supplied with information from a global positioning system (GPS) receiver 41, a direction sensor 42, a speed sensor 43, and an acceleration sensor 44.

The controller 20 includes a computer with a CPU, ROM, RAM, an I/O device, and a bus line connecting these components.

The communication device 31 performs data communication with a center 50 via a network such as the Internet or the like. The center 50 delivers map data for update, if a new road is opened.

The memory 32 acts as a storage device and temporarily stores operation results of various processes. The memory 32 may be a static RAM, for example.

The map data storage device 33 may be a hard disk drive (HDD) or the like, and stores the map data. The map data storage device 33 is not limited to an HDD and may be any storage device as long as the storage device can retain stored contents after the power is turned off. The map data includes a road data, a facility data, a map matching data, and a guidance data. The road data includes links representing roads and nodes at the ends of roads. In the road data, a link is associated with a link ID for specifying the link, a node ID for specifying a node at an end of the link, a road rank for indicating a road scale, a distance data for indicating a length of the link, and a traffic congestion data indicating a traffic congestion degree. A node representing an intersection is associated with an intersection ID for specifying the intersection.

The storage medium 34 may be an HDD or the like, as is the case in the map data storage device 33. However, the storage medium 34 may be other than HDD, as is the case in the map data storage device 33. The storage medium 34 stores a turning information on an intersection-by-intersection basis. The turning information of each intersection includes a passage count, a turn count, and a non-turn count at the intersection. In the storage medium 34, a database for a similarity determination (described later) is built.

The GPS receiver 41 receives signals transmitted from GPS artificial satellites and detects a coordinate point (longitude and latitude) and a height (altitude) of a vehicle. The direction sensor 42 outputs a detection signal corresponding to an angular velocity of rotational motion of the vehicle. The speed sensor 43 detects a vehicle speed. The acceleration sensor 44 detects a vehicle acceleration.

The controller 20 includes various function blocks. As shown in FIG. 1, as the functional blocks, the controller 20 includes a route search device 21 (which can correspond to an example of route search means), a prediction device 22 (which can correspond to an example of prediction means), and a turning information recording device 23 (which can correspond to an example of turning information recording means).

A turning information recording process will be described with reference to the flowchart in FIG. 2. The turning information recording process is provided as a function of the turning information recording device 23 and is repeatedly performed at specified intervals while the vehicle is running.

At S100, the turning information recording device 23 make a determination as to passage through an intersection. Specifically, the turning information recording device 23 determines whether or not the vehicle has passed through an intersection. For example, the turning information recording device 23 acquires a link ID at the present vehicle position. In response to a change in the link, the turning information recording device 23 determines whether or not a node at the end of the link corresponds to the intersection. At this time, the turning information recording device 23 records the link ID corresponding to an entry link of the intersection and the link ID corresponding to an exit link of the intersection. If it is determined that the vehicle has passed through the intersection (YES at S100), the process proceeds to S110. If it is determined that the vehicle has not passed through the intersection (NO at S100), the turning information recording device 23 does not perform the subsequent process and terminates the turning information recording process.

At S110, the turning information recording device 23 acquires the intersection ID. As described above, the node representing an intersection is associated with the intersection ID. The turning information recording device 23 acquires this intersection ID. At S110, the turning information recording device 23 specifies the intersection that the vehicle has traveled through.

At S120, the turning information recording device 23 updates the passage count of the intersection which indicates the number of times the vehicle has passed through the intersection. Specifically, in S120, the turning information recording device 23 S120 updates the cumulative total count of the passage through the intersection. This passage count is stored on an entry-link-by-entry-link basis. For example, for a 4-way intersection, four passage counts are respectively and independently stored to correspond to four directions of roads meeting at the 4-way intersection.

Figure 6A:
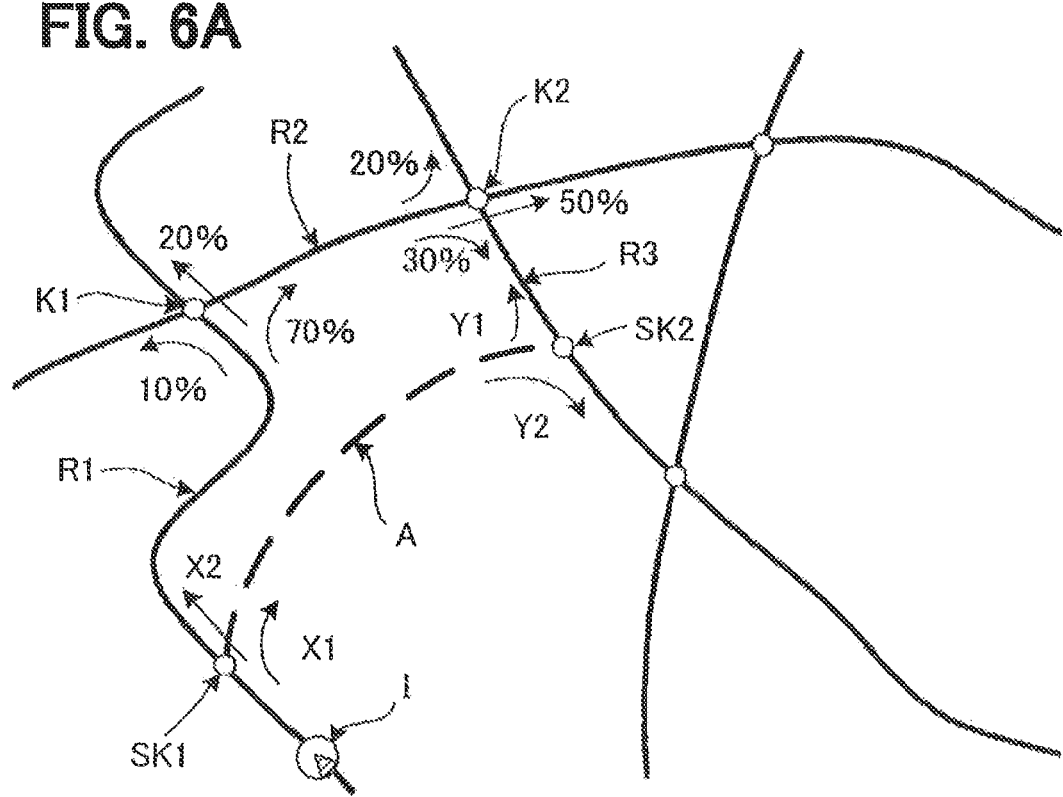
FIGS. 6A and 6B are explanatory diagrams for facilitating understanding of the processes.

At S130, the turning information recording device 23 updates the count of turning (i.e., turn count) or the count of not turning (no-turn count). For example, the turning information recording device 23 updates one of a right-turn count, a left-turn count and a no-turn count at the intersection whose passage count has been updated. Specifically, based on the exit link in relation to the entry link, the turning information recording device 23 determines whether or a right turn, a left turn, or a no turn has been made at the intersection, and updates one of the right-turn count, the left-turn count, and the no-turn count. The right-turn count, the left-turn count, and the no-turn count are stored on an entry-link-by-entry-link basis. These counts are used to obtain percentages (probabilities) that a right-turn, a left-turn, and a no-turn from a given entry link (direction) is made. As illustrated in FIG. 6A, for example, the right-turn from the link R1 is made at a crossing intersection K1 with the probability of 70%, the left-turn from the link R1 is made with the probability of 10% and the no-turn from the link R1 is made with the probability of 20%. The percentage is also referred to herein as turning probability.

At S140, the turning information recording device 23 records the passage count, the turn count, and the no-turn count as the turning information in the storage medium 34 on an intersection-by-intersection basis.

Now, a turning probability prediction process will be described with reference to the flowchart in FIG. 3. The controller 20 (specifically, the prediction device 22) repeatedly performs this process at specified time intervals while the vehicle is running.

At S200, the controller 20 determines whether or not a new road is added. If the new road is opened, the center 50 delivers the corresponding map data for update. In this case, the controller 20 receives the map data, for example, via the communication device 31, and rewrites the map data in the map data storage device 33. Additionally, the controller 20 records an update date of the map data corresponding to the new road. Based on the update date of the map data, the controller 20 can determine whether or not the new road has been just added. If it is determined that the new road is added (YES at S200), the process proceeds to S210. If it is determined that the new road is not added (NO at S200), the controller 20 does not perform the subsequent process and terminates the turning probability prediction process.

At S210, the controller 20 retrieves a route that, while extending along a prestored road, leads from a start point to an end point of the new road. S210 may be provided as a function of the route search device 21. In the present disclosure, the prestored road is defined as a road that is already stored in the map data storage device 33 before the addition of the new road. The start point of the new road is an intersection at one end of the new road. The end point of the new road is an intersection at the other end of the new road. In the present embodiment, only one route present in the traveling direction of the vehicle is retrieved. However, the route to be retrieved is not limited to the route present in the traveling direction of the vehicle. A route providing the shortest travel time, or the shortest length or the like may be selected from multiple routes each extending along the prestored road and leading from the start point to the end point of the new road.

At S220, the controller 20 calculates the turning probability by using the turning information corresponding to an intersection (hereinafter referred to as an intermediate intersection) present in the course of the route retrieved at S210. The intersection present in the course of the route retrieved at S210 is hereinafter referred to as an intermediate intersection. As described above, the turning information corresponding to each intersection is stored in the storage medium 34.

At S230, the controller 20 predicts the probability that a turn is made at the intersection at each end of the new road. Specifically, the probability that the turn is made at the start point of the new road and the probability that the turn is made at the end point of the new road are calculated based on the probability that the turn is made at the intermediate intersection present in the course of the prestored-road route retrieved at S210.

At S240, the controller 20 records the probability that the turn is made at the intersection at the end of the new road. Specifically, the turning probabilities calculated at S230 are recorded. At S250, the controller 20 records information about the retrieved route in the database.

Now, specific examples will be described to facilitate understanding of the turning probability prediction process.

As illustrated in FIG. 6A, let us assume that the vehicle is running at a position denoted by symbol I. In cases where a new road A (shown in broken line) is added to the map (YES at S200 in FIG. 3), the controller 20 retrieves one route which is present in the traveling direction of the vehicle and which leads from a start point SK1 to an end point SK2 of the new road A (S210). Here, it is assumed that the route including three links R1, R2 and R3 is retrieved by the controller 20.

In the course of the route, intermediate intersections K1 and K2 are present. The controller 20 calculates the probabilities that the turns are made at intermediate intersections K1 and K2, from the turning informations of the intermediate intersections K1 and K2 (S220 in FIG. 3). The controller 20 then predicts the probability that the turn is made at the start point SK1 of the new road A and the probability that the turn is made at the end point SK2 of the new road (S230).

The probability X1 that the turn to the new road A is made at the start point SK1 is calculated by multiplying two probabilities each other. One of the two probabilities is the probability that the turn toward the end point SK2 along the route is made at the intersection K1. The other is the probability that the turn toward the end point SK2 along the route is made at the intersection K2. Thus, the probability X1 is calculated to be:

$$X1 = 70 \times 30 = 21 (\%)$$

Therefore, the probability X2 that the turn to the new road A is not made is given as:

$$X2 = 100 - 21 = 79(\%)$$

As shown in FIG. 6A The controller 20 calculates the probability Y1 that the turn is made at the end point SK2, by using the probability that turn the turn toward the end point SK2 is not made at the intersection K2. The probability Y1 is calculated to be:

$$Y1 = 70 \times (20 + 50) = 49(\%)$$

Therefore, the probability Y2 that of turning at the end point SK2 results in:

$$Y2 = 100 - 49 = 51(\%)$$

Figure 3:
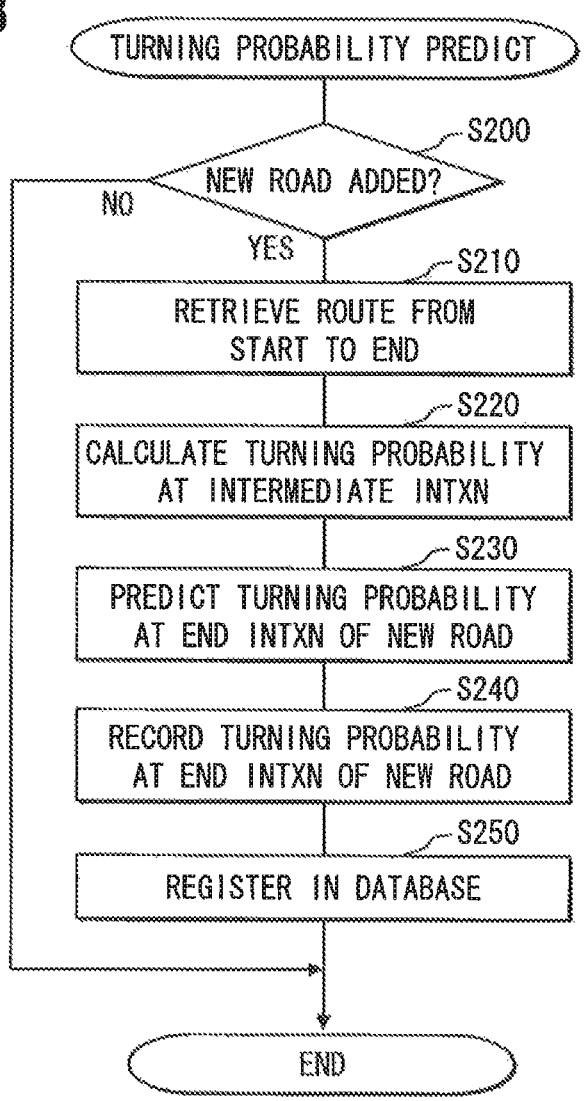
FIG. 3 is a flowchart illustrating a turning probability prediction process.

The controller 20 records the turning probability X1 (and/or X2) at the start point SK1 and the turning probability Y1 (and/or Y2) at the end point SK2 as initial value of the turning probabilities (S240 in FIG. 3). In addition, the controller 20 records the information about the route in the database (S250).

The database may be configured as illustrated in FIG. 7. The second row in the database stores a road rank of each link forming the route. The road rank may be expressed in predetermined numeric values. For facilitating understanding, in the example shown in FIG. 7, the road ranks are described as a narrow road, an arterial road and a narrow road. In FIG. 6A, for example, the link R1 represents a one-lane narrow road, the link R2 represents an arterial road, and the link R3 represents a one-lane narrow road.

The third row in the database stores the number of intermediate intersections in the route. The third row stores "2" because FIG. 6A illustrates two intermediate intersections K1 and K2.

On an intermediate-intersection-by-intermediate-intersection basis, the fourth and fifth rows store (i) the number of roads coming together at the intermediate intersection (n-way intersection) and (ii) the turning probabilities at the intermediate intersection. These turning probabilities are used as initial values in route retrieval. A flag is set to the probability that the turn toward the end point of a new road is made (i.e., the probability that the turn is made in the direction toward the end point of the new road). This flag is marked with "*" in FIG. 7.

Figure 4:
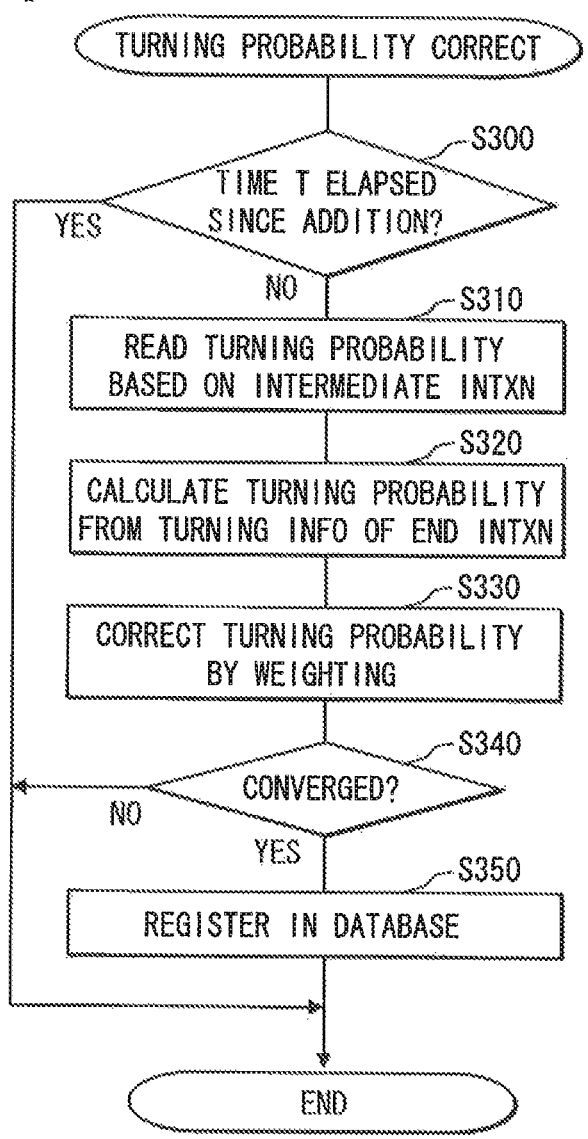
FIG. 4 is a flowchart illustrating a turning probability correction process.

A turning probability correction process will be described with reference to the flowchart in FIG. 4. The controller 20 repeatedly performs this process at specified time intervals while the vehicle is running.

At S300, the controller 20 determines whether or not an elapsed time from the addition of the new road reaches a time T. If it is determined that the elapsed time reaches the time T (YES at S300), the controller 20 does not perform the subsequent process and terminates the turning probability correction process. If it is determined that the elapsed time has not reached the time T (NO at 3300), the process proceeds to S310. The time T will be specifically described later.

At S310, the controller 20 reads the turning probability that is based on the intermediate intersection. Specifically, at S310, the controller 20 reads the initial value of the probability that the turn is made at the intersection at the end of the new road. Note that this initial value to be read at S310 is the initial value recorded at S240 in FIG. 3, The initial value of the probability is denoted by Pa.

At S320, the controller 20 calculates the turning probability based on the turning information of the intersection at the end of the new road. Specifically, at S320, the turning probability is calculated from the turning information, which is associated with the intersection at the end of the new road and was recorded when the vehicle actually traveled through the intersection at the end of the new road. The turning probability calculated at S320 is denoted by Pb.

At S335, the controller 20 performs weighting to correct the turning probability. Specifically, at S335, from the initial value Pa of the turning probability recorded at S240 and the turning probability Pb calculated based on the turning information, the controller obtains the corrected turning probability at the intersection at the end of the new road. For example, the corrected turning probability is calculated to be:

$$\text{Corrected turning probability} = \{Pa \times (T-t) + Pb \times t\} \div T,$$

where t denotes the elapsed time from the addition of the new road. T denotes the upper limit of the elapsed time t. The upper limit T is set to a time period that makes the turning probability Pb reliable, because the turning probability Pb is given based on a traveling history. The upper limit may be set to, for example, two to three months. In the above example, the controller 20 performs the weighting by using the elapsed time. Alternatively, as a parameter for correcting the turning probability at S335, the controller 20 may use, instead of the elapsed time, the number of times the vehicle has actually passed through the intersection at the end of the new road.

At S340, the controller 20 makes a determination of whether or not the probability that the turn is made at the intersection at the end of the new road is converged. This determination becomes affirmative (YES) when the elapsed time from the addition of the new road reaches the time T. If it is determined that the turning probability is converged (YES at S340), the controller 20 records a converged value of the turning probability in the database (S350) and then terminates the turning probability correction process. The converged value is illustrated on the top row in FIG. 7. As long as it is determined that the turning probability is not converged (NO at S340), the controller 20 terminates the turning probability correction process without performing subsequent process.

A turning similarity determination process will be described with reference to the flowchart in FIG. 5. The controller 20 repeatedly performs this process at specified time intervals while the vehicle is running.

At S400, the controller 20 determines whether or not the new road is added. S400 is the same as S200 in FIG. 3. If it is determined that the new road is added (YES at S400), the process proceeds to S410. If it is determined that the new road is not added (NO at S400), the controller 20 does not perform the subsequent process and terminates the turning similarity determination process.

At S410, the controller 20 retrieves a route that, while extending along the prestored road, leads from the start point to the end point of the new road. The S410 is the same as S210 in FIG. 3.

At S420, the controller 20 acquires a connection information of the route retrieved at S410. In the present embodiment, the acquired connection information includes the road ranks associated with the links forming the route and the number of intermediate intersections in the route.

At S430, the controller 20 references the database, which is, for example, such database as illustrated in FIG. 7.

At S440, the controller 20 determines whether or not there is similarity. Specifically, at S440, the controller 20 determines whether or not there is the similarity (matching) between the new road added this time and the new road added in past. For example, the controller 20 may determine whether or not there is the similarity (matching) between the route that has been retrieved this time at S410 and the route that was retrieved in the past. For example, by referencing the database at S430, the controller 20 determines, on the promise that there is the matching in terms of the road rank and the number of intermediate intersections in the retrieved route, whether or not a degree of matching (e.g., a difference) in the turning probability at the intermediate intersection falls within a predetermined range.

If it is determined that there is the similarity (YES at S440), the process proceeds to S450. If it is determined that there is no similarity (NO at S440), the controller 20 does not perform the subsequent process and terminates the turning similarity determination process.

At S450, the controller 20 adopts the turning probability stored in the database. Specifically, at S450, as the turning probability at the intersection at the end of the new road, the controller adopts the turning probability (i.e., he converged value of probability of turning) illustrated on the top row in FIG. 7.

At S460, the controller 20 records the turning probability at the intersection the new road and terminates the turning similarity determination process. S460 is substantially the same as S240 in FIG. 3.

In the above illustration, the turning probability prediction process, the turning probability correction process, and the turning similarity determination process have been described in this order for convenience sake. However, in practice, in response to the addition of a new road, the turning similarity determination process may be performed first. This is because, if there is the similarity in the connection information, it is efficient to adopt the converged value of the turning probability stored in the database. In this case, it becomes unnecessary to perform the turning probability prediction process.

The turning similarity determination process will be specifically illustrated with reference to an example situation.

Figure 5:
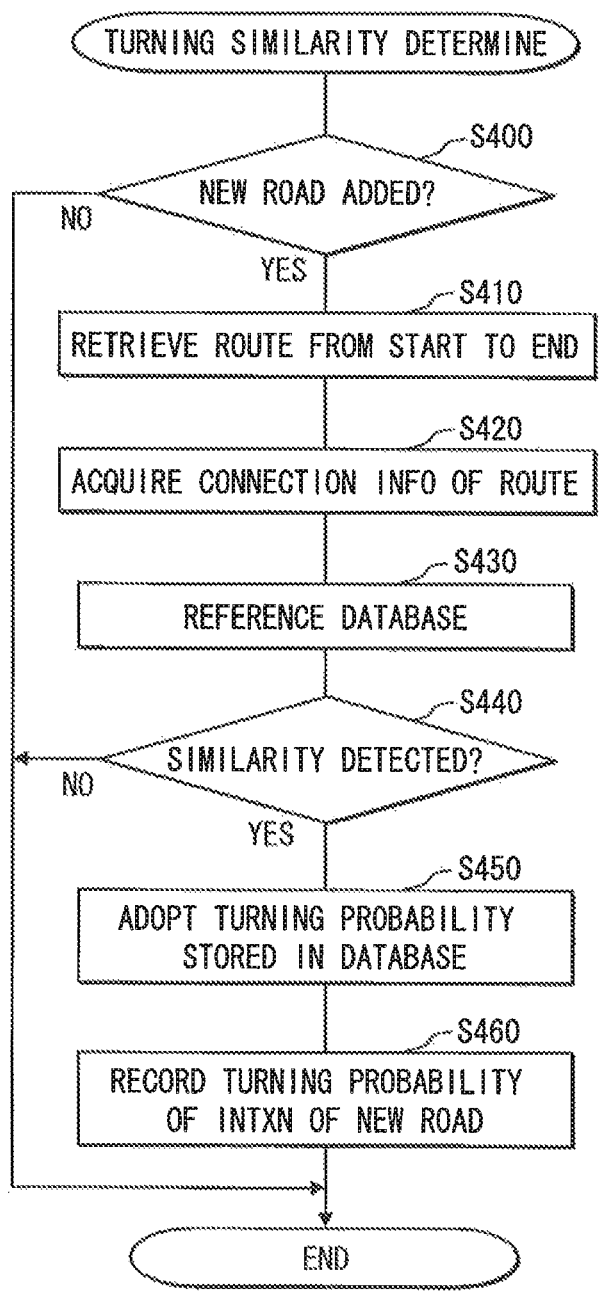
FIG. 5 is a flowchart illustrating a turning similarity determination process.
Figure 6B:
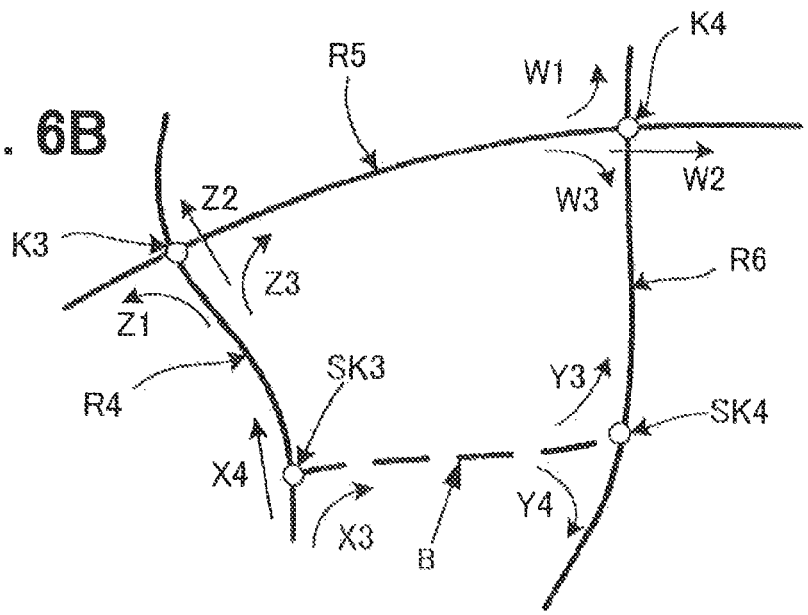

Let us assume a situation where a new road B shown by broken line in FIG. 6B is added to the map (YES at S400 in FIG. 5). In this situation, the controller 20 retrieves a single route leading from a start point SK3 to an end point SK4 of the new road B, so that the retrieved single route is present in the traveling direction of the vehicle (S410). It is assumed that the controller 20 retrieves the route extending along three links R4, R5, and R6.

The controller 20 then acquires the connection information of the route (S420 in FIG. 5). In the example shown in FIG. 6B, the controller 20 acquires the road ranks of three links R4, R5, and R6, and also acquires "two" as the number of intermediate intersections, i.e., intermediate intersections K3 and K4.

The controller 20 references the database (S430 in FIG. 5) and determines whether or not the route retrieved this time and the route retrieved in the past (just after the opening oft the new road A) have the same arrangement of road links and the same number of intermediate intersections. When the route retrieved this time and the route retrieved in the past (just after the opening oft the new road A) have the same arrangement of road links and the same number of intermediate intersections, the controller 20 then compares (i) the turning probabilities at the intermediate intersections K1 and K2 stored in the database (i.e., the turning probabilities at the intermediate intersections K1 and K2 just after opening the new road A) with (ii) the turning probabilities Z1 to Z3, W1 to W3 at the intermediate intersections K3 and K4 present on the route retrieved this time. From a result of the comparison result, it may be determined that the matching falls within the predetermined range. Specifically, it may be determined that the difference between the turning probabilities is lower than a threshold value (YES at S440). In this case, as the turning probabilities at the start point SK3 and the end point SK4 of the new road B, the controller 20 adopts the turning probabilities at the start point SK1 and the end point SK2 of the new road A stored in the database. It is assumed that a sufficient time has elapsed since the new road A was opened and that the turning probabilities at SK1 and SK2 have been converged.

In the above embodiment, on an intersection-by-intersection basis, the storage medium 34 stores the turning information, from which the turning probability of at an intersection is identifiable. The controller 20 retrieves a route that while extending along the prestored road, leads from the intersection at one end of the new road to the intersection at the other end of the new road (S210 in FIG. 3). The controller 20 predicts the turning probabilities at the intersections SK1 and SK2 at the ends of the new road, based on the turning probabilities at the intermediate intersections K1 and K2 present in the course of the retrieved route (8220 and S230).

More specifically, by retrieving the route which extends along the prestored road and relates to the new road and by using the turning probability at the intersection present on the retrieved route, the controller 20 predicts the turning probability at the intersection at an end of the new road. Therefore, even immediately after a new road has been opened, the controller 20 can predict the turning probability to predict vehicle right/left turn.

In the above embodiment, only one route present in the vehicle traveling direction is retrieved (S210 in FIG. 3). Specifically, the route search device 21 retrieves one route extending along the prestored road. Because of this, it is possible to simplify processing of the turning probability at the intermediate intersection. It should be noted that although the route present in the traveling direction is retrieved in the present embodiment, the route to be retrieved is not limited to the route present in the traveling direction.

In the present embodiment, the probability X1 that the turn to the new road A is made at the start point SK1 is obtained by multiplying (i) the probability that the turn toward SK2 is made at the intersection K1 by (ii) the probability that the turn toward SK2 is made at the intersection K2, where the intersections K1 and K2 are on the route and are at the end point of the new road (see FIG. 6A). Specifically, the prediction device 22 predicts the turning probability of the intersection at the one end of the new road, by multiplying, by each other, (i) the probabilities that the turns toward the other end of the new road of the new road are made at the first to n-th intermediate intersections (i.e., the probabilities that the turns in a direction toward the other end of the new road are made). That is, the turning probability at the intersection at the one end of the new road is calculated to be a first probability that the turn toward the other end of the new road is made at the $1^{st}$ intermediate intersection times a second probability that the turn toward the other end of the new road is made at the $2^{nd}$ intermediate intersection . . . times an n-th probability that the turn toward the other end of the new road is made at the n-th intermediate intersection. Because of this, it is possible obtain an appropriate turning probability at the intersection at the end (start point) of the new road. Note that "n" is natural number.

In the above embodiment, the turning probability Y1 at the end point SK2 is calculated by using the probability that the turn 2 to the end point SK2 is not made at the intersection K (see FIG. 6A). The prediction device 22 predicts the turning probability at the intersection at the other end of the new road, by multiplying, by each other, (i) the probabilities that the turns toward the intersection at the other end of the new road are made at the first to the (n−1)-th intermediate intersections and (ii) the probability that the turn toward the intersection at the other end of the new road is not made at the n-th intermediate intersection. Because of this, it is possible obtain an appropriate turning probability at the intersection at the other end (end point) of the new road.

In the present embodiment, the turning probability prediction apparatus acquires the connection information of the rout (S420 in FIG. 5), and references the database (S430) to check whether the route retrieved this time and the route retrieved in past have the same arrangement of road links and the same number of intermediate intersections. When the route retrieved this time and the route retrieved in past have the same arrangement of road links and the same number of intermediate intersections, the turning probability prediction apparatus then compares the turning probabilities at the intermediate intersections K1 and K2 stored in the database with the turning probabilities Z1 to Z3, W1 to W3 at the intermediate intersections K3 and K4 present on the route retrieved this time. From a result of the comparison, it may be determined that the matching falls within the predetermined range (YES at S440). Specifically, from the result of the comparison, it may be determined that the difference between the turning probabilities is lower than the threshold value (YES at S440). In this case, the turning probabilities at the start point SK1 and the end point SK2 of the new road A stored in the database are adopted as the turning probabilities at the start point SK3 and the end point SK4 of the new road B. In other words, if the new road was added in the past, the prediction device 22 uses the connection information of the route retrieved in the past and the turning probability at the intermediate intersection on the route retrieved in the past, in order to determine (i) a degree of similarity between the connection information of the route retrieved at the present time and the connection information of the route retrieved in past and (i) a degree of similarity between the turning probability at the intermediate intersection on the route retrieved at the present time and the turning probability at the intermediate intersection on the route retrieved in the past. In the case of high degrees of similarity, the prediction device 22 uses the turning probability at the intersection at the end of the new road added in the past, as the turning probability at the intersection at the end of the newly-added new road. Because of this, it is possible to a highly-appropriate turning probability at the intersection at the end of the new road. Moreover, since the turning probability (converged value) at an intersection at an end of a similar new road is used as the turning probability (initial value) at an intersection at an end of a target new road, it is expected that the turning probability at the intersection at the end of the targeted new road can be accurately and simply converged.

In the above, the connection information of the route includes the number of intermediate intersections and the road rank associated with the links forming the route. Therefore, it is possible to determine a degree of similarity between routes.

In the embodiment, the turning probability Pa, which is based on the intermediate intersection, is read (S310 in FIG. 4), and the turning probability Pb is calculated from the turning information of the intersection at the end of the new road (S320), and then, a correction to the turning probability is made (S330). Specifically, the turning probability predicted based on the intermediate intersection is corrected by the prediction device 22 by using the turning probability that is specified from the stored turning information of the intersection at the end of the new road. This makes appropriate the turning probability at the intersection at the end of the new road.

In the embodiment, in correcting the turning probability, the turning probability prediction apparatus performs weighting on the turning probability Pa and the turning probability Pb by using the elapsed time t. Specifically, the prediction device 22 makes the correction by performing weighting on both of the turning probability Pa and the turning probability Pb by using the elapsed time from the addition of the new road as a weighting parameter (weighting factor). Therefore, it is possible to obtain an appropriate turning probability at the intersection at the end of the new road.

In response to determining that the vehicle has passed through the intersection (YES at S100 in FIG. 2), the turning probability prediction apparatus acquires the intersection ID (S110), updates the passage count of the intersection (S120), and updates the turn count (left turn count, right turn count) or the n-turn count (straight-run count) of the intersection (S130), so that the passage count, the turn count, and the no-turn count are stored as the turning information in the storage medium 34 on an intersection-by-intersection basis (S140). The turning probability prediction apparatus includes the turning information recording device 23 that stores, in the storage medium 34, the turning information associated with an intersection, so that when an intersection is crossed, the turning probability corresponding to the intersection can be specified. Because of this, the turning probability prediction apparatus can calculate the turning probability at each intersection without communicating with the external center 50.

It should be noted that embodiments of the present disclosure are not limited to the above illustrated embodiment. Embodiments of the present disclosure can have various forms, examples of which will be described below.

(a) In the above embodiment, the road rank and the number of intermediate intersections associated with links configuring the route are used as the connection information of the route.

Alternatively, one of the road rank and the number of intermediate may be used as the connection information of the route. This advantageously simplifies the processes.

The connection information of the route may include a link distance e associated with a link, a traffic congestion degree associated with a link, the number of turns at an intersection associated with a node, in addition to the road rank and the number of intermediate intersections. This enables to more appropriately determine a degree of similarity between routes.

(b) In the above embodiment, the weighting on the turning probability Pa, which is the initial value, and the turning probability Pb, which is based on the turning information, is performed by using the elapsed time t. However, a parameter in the weighting is not limited to the elapsed time t and may be a parameter that is based on the lapse of time. For example, a parameter may represent the number of passage through the intersection at the end of the new road.

Figure 2:
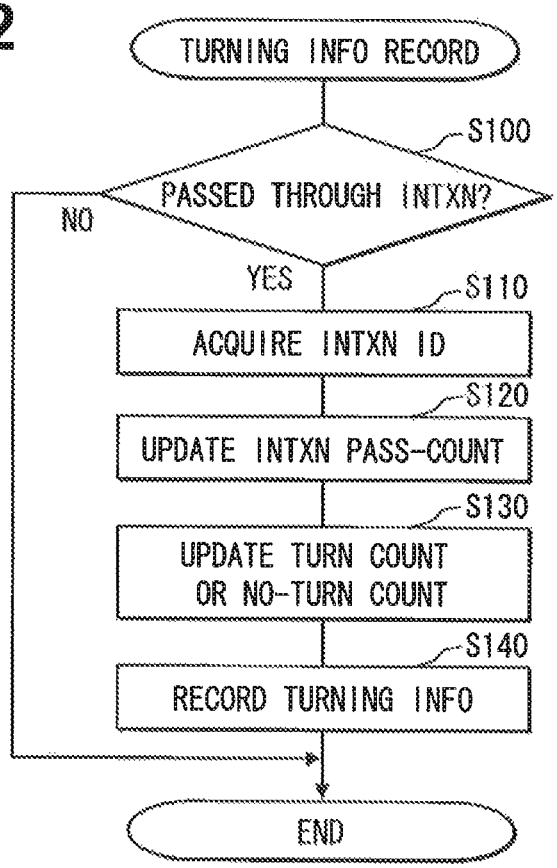
FIG. 2 is a flowchart illustrating a turning information recording process.

(c) In the above embodiment, on an intersection-by-intersection basis, the passage count, turn count, and no-turn count are stored as the turning information in the storage medium 34 (S140 in FIG. 2). Alternatively, the storage medium 34 may store the turning probability itself calculated from the turning information.

The present disclosure is not limited the above embodiments and modifications thereof. That is, the above embodiments and modifications thereof may be modified in various ways without departing from the sprit and scope of the present disclosure.

What is claimed is:

1. A turning probability prediction apparatus, comprising:
a map data storage device configured to store map data including road data, the road data including links representing a prestored road and nodes representing intersections of the pre-stored road;
a non-transitory storage medium configured to store turning information on an intersection-by-intersection basis of the prestored road, the turning information comprising probabilities of making respective turns at an at least one intermediate intersection of the prestored road;
a controller, with a processor, configured to update the map data stored in the map data storage device to include a new road based on update data received from a center and to determine whether the new road is added to the map data;
a route search device that, when the controller determines that the new road is added to the map data, retrieves a route comprising the prestored road and the new road, the new road including a first intersection at a first end and a second intersection at a second end, each of the first intersection and the second intersection intersecting the prestored road; and
a prediction device that predicts a probability of turning at the first end of the new road, based on the probabilities of making respective turns at the at least one intermediate intersection specified by the turning information stored in the non-transitory storage medium, wherein
the at least one intermediate intersection is different than the first intersection and the second intersection of the new road, and is arranged in the route comprising the prestored road retrieved by the route search device, and
the controller, with the processor, is configured to store the predicted probabilities in a database.

2. The turning probability prediction apparatus according to claim 1, wherein: the route search device retrieves a single route extending along the prestored road.

3. The turning probability prediction apparatus according to claim 1, wherein:
the prediction device predicts the probability of turning at the first end of the new road, by multiplying, by each other, probabilities of turning toward the second end of the new road are made at the at least one intermediate intersection.

4. The turning probability prediction apparatus according to claim 1, wherein:
the at least one intermediate intersection comprises n intermediate-intersections,
the prediction device predicts a probability of turning at the second end of the new road, by multiplying, by each other,
respective probabilities of turning toward the second intersection at the second end of the new road are made at the first to (n−1)-th intermediate intersections and
a probability of turning toward the second intersection at the second end of the new road is not made at the n-th intermediate intersection.

5. The turning probability prediction apparatus according to claim 1, wherein:
in cases where there is another new road that was added at a past time, the prediction device uses (i) a connection information of the route retrieved at the past time and (ii) a probability of turning at the at least one intermediate intersection in the route retrieved at the past time, and determines a degree of similarity between the connection information of the route retrieved at the past time and a connection information of the route retrieved at a present time, and a degree of similarity between the probability of turning at the at least one intermediate intersection in the route retrieved at the past time and a probability of turning at the at least one intermediate intersection in the route retrieved at the present time, thereby adopts a probability of turning at the new road added at the past time, as a probability of turning at the new road added at the present time.

6. The turning probability prediction apparatus according to claim 5, wherein:
the probability of turning at the new road added at the past time is a converged value that is based on the turning information of the first intersection at the first end of the new road added at the past time.

7. The turning probability prediction apparatus according to claim 5, wherein:

the connection information of the route includes information about a road rank indicating a scale of each link forming the route.

8. The turning probability prediction apparatus according to claim 5, wherein:
the connection information of the route includes a number of the at least one intermediate intersection present on the route.

9. The turning probability prediction apparatus according to claim 7, wherein:
the connection information of the route further includes at least one of
a length of each link forming the route,
a traffic congestion degree in each link forming the route, and
a number of arms coming together at each intermediate intersection in the route.

10. The turning probability prediction apparatus according to claim 1, wherein:
the probability predicted based on the at least one intermediate intersection is corrected by the prediction device, by using the probability that is specified based on the turning information stored for the new road.

11. The turning probability prediction apparatus according to claim 10, wherein:
the prediction device corrects the probability by performing weighting on both of (i) the probability predicted based on the at least one intermediate intersection and (ii) the probability specified based on the turning information stored for the new road, where in performing the weighting, the prediction device uses a parameter that is based on an time elapsed from addition of the new road.

12. The turning probability prediction apparatus according to claim 1, comprising:
a turning information recording device that, in response to passage through the first intersection, records in a storage medium the turning information for specifying the probability of turning at the new road.

13. A turning probability prediction method, comprising:
storing map data on a map data storage device, the map data including road data with links representing a prestored road and nodes representing intersections of the prestored road;
storing turning information, on an intersection-by-intersection basis of the prestored road, on a non-transitory storage medium, the turning information comprising probabilities of making respective turns at an at least one intermediate intersection of the prestored road;
updating the map data, via a controller with a processor, to include a new road that is different than the prestored road, the updating of the map data is based on update data received from a center; and
determining, via the controller with the processor, whether the new road is added to the map data;
retrieving a route, via a route search device, the route comprising the prestored road and the new road, the new road comprising a first intersection at a first end and a second intersection at a second end, each of the first intersection and the second intersection intersecting the prestored road;
predicting, via a prediction device, a probability of turning at the first end of the new road based on the probabilities of making respective turns at the at least one intermediate intersection specified by the turning information stored in the non-transitory storage medium; and
storing the predicted probabilities, via the controller with the processor, in a database.

14. A non-transitory computer readable storage medium for performing a turning probability prediction method, comprising instructions stored thereon, that when executed on a processor, perform the steps of:
storing map data on a map data storage device, the map data including road data with links representing a prestored road and nodes representing intersections of the prestored road;
storing turning information, on an intersection-by-intersection basis of the prestored road, on a non-transitory storage medium, the turning information comprising probabilities of making respective turns at an at least one intermediate intersection of the prestored road;
updating the map data, via a controller with a processor, to include a new road that is different than the prestored road, the updating of the map data is based on update data received from a center; and
determining, via the controller with the processor, whether the new road is added to the map data;
retrieving a route, via a route search device, the route comprising the prestored road and the new road, the new road comprising a first intersection at a first end and a second intersection at a second end, each of the first intersection and the second intersection intersecting the prestored road;
predicting, via a prediction device, a probability of turning at the first end of the new road based on the probabilities of making respective turns at the at least one intermediate intersection specified by the turning information stored in the non-transitory storage medium; and
storing the predicted probabilities, via the controller with the processor, in a database.

15. The turning probability prediction apparatus according to claim 13, further comprising predicting, via a prediction device, a probability of turning at the second end of the new road based on the probabilities of making respective turns at the at least one intermediate intersection.

16. The turning probability prediction apparatus according to claim 14, further comprising predicting, via a prediction device, a probability of turning at the second end of the new road based on the probabilities of making respective turns at the at least one intermediate intersection.

* * * * *